(12) United States Patent
Ghetie

(10) Patent No.: US 11,803,644 B2
(45) Date of Patent: Oct. 31, 2023

(54) SECURITY HARDENED PROCESSING DEVICE

(71) Applicant: SDG Logic Inc., Hillsboro, OR (US)

(72) Inventor: Sergiu Ghetie, Hillsboro, OR (US)

(73) Assignee: SDG Logic Inc., Hillsboro, OR (US)

(*) Notice: Subject to any disclaimer, the term of this patent is extended or adjusted under 35 U.S.C. 154(b) by 144 days.

(21) Appl. No.: 16/934,690

(22) Filed: Jul. 21, 2020

(65) Prior Publication Data

US 2021/0026966 A1 Jan. 28, 2021

Related U.S. Application Data

(60) Provisional application No. 62/877,623, filed on Jul. 23, 2019.

(51) Int. Cl.
 *G06F 21/57* (2013.01)
 *H04L 9/30* (2006.01)

(52) U.S. Cl.
 CPC .......... *G06F 21/575* (2013.01); *H04L 9/30* (2013.01); *G06F 2221/034* (2013.01)

(58) Field of Classification Search
 CPC ..... G06F 21/575; G06F 2221/034; H04L 9/30
 See application file for complete search history.

(56) References Cited

U.S. PATENT DOCUMENTS

| 9,893,885 | B1* | 2/2018 | Miller | H04L 9/3066 |
|---|---|---|---|---|
| 10,565,382 | B1* | 2/2020 | Diamant | H04L 9/0897 |
| 2009/0202069 | A1* | 8/2009 | Cox | G06F 21/575 |
| | | | | 380/44 |
| 2012/0008768 | A1* | 1/2012 | Mundra | H04L 9/0637 |
| | | | | 380/28 |
| 2015/0379270 | A1* | 12/2015 | Chen | H04L 9/0894 |
| | | | | 713/2 |
| 2017/0308705 | A1* | 10/2017 | Karaginides | G06F 8/654 |
| 2018/0167199 | A1* | 6/2018 | Kaul | G09C 1/00 |
| 2018/0307867 | A1* | 10/2018 | Dover | H04L 9/0897 |
| 2019/0138730 | A1* | 5/2019 | Liu | G06F 21/575 |
| 2019/0220602 | A1* | 7/2019 | Ruan | G06F 21/64 |
| 2019/0236279 | A1* | 8/2019 | Depew | G06F 9/44505 |
| 2019/0325140 | A1* | 10/2019 | Alon | H04L 9/3271 |

(Continued)

OTHER PUBLICATIONS

Lebedev et al., "Invited Paper: Secure Boot and Remote Attestation in the Sanctum Processor," 2018 IEEE 31st Computer Security Foundations Symposium (CSF), Oxford, UK, 2018, pp. 46-60 (Year: 2018).*

*Primary Examiner* — Chau Le
*Assistant Examiner* — Zhe Liu
(74) *Attorney, Agent, or Firm* — Polsinelli LLP

(57) ABSTRACT

Techniques are described herein for security hardened processing devices. For example, a method can include performing a secure boot of a processing device of a computer system. The processing device is configured as a root of trust for a secure boot process. The computer system can include the processing device and a non-volatile memory storing a basic input/output system (BIOS) for the secure boot process. The method can include identifying a set of programmable fuses of the processing device, deriving an encryption key using a value encoded by the set of programmable fuses in the processing device, and authenticating the BIOS to perform the secure boot process using a key derivation algorithm based on the encryption key.

18 Claims, 4 Drawing Sheets

(56) References Cited

U.S. PATENT DOCUMENTS

| | | | | |
|---|---|---|---|---|
| 2019/0340365 A1* | 11/2019 | Nijhawan | ............... | G06F 21/44 |
| 2020/0100108 A1* | 3/2020 | Everson | ............... | H04L 9/3242 |
| 2020/0213115 A1* | 7/2020 | Mathane | ............... | G06F 21/575 |
| 2020/0307401 A1* | 10/2020 | Mondello | ........... | H04L 63/0823 |
| 2022/0188418 A1* | 6/2022 | Aschauer | ............... | G06F 21/57 |

\* cited by examiner

300

---

IDENTIFY A SET OF PROGRAMMABLE FUSES OF A PROCESSING DEVICE, THE PROCESSING DEVICE BEING CONFIGURED AS A ROOT OF TRUST FOR A SECURE BOOT PROCESS, A COMPUTER SYSTEM COMPRISING THE PROCESSING DEVICE AND A NON-VOLATILE MEMORY STORING A BASING INPUT/OUTPUT SYSTEM (BIOS) FOR THE SECURE BOOT PROCESS
302

↓

DERIVE AN ENCRYPTION KEY USING A VALUE ENCODED BY THE SET OF PROGRAMMABLE FUSES IN THE PROCESSING DEVICE
304

↓

AUTHENTICATE THE BIOS TO PERFORM THE SECURE BOOT PROCESS USING A KEY DERIVATION ALGORITHM BASED ON THE ENCRYPTION KEY
306

FIG. 3

SECURITY HARDENED PROCESSING DEVICE

CROSS-REFERENCE TO RELATED APPLICATIONS

This application claims the benefit of U.S. Provisional Application No. 62/877,623 filed Jul. 23, 2019, which is hereby incorporated by reference, in its entirety and for all purposes.

BACKGROUND

Emerging hardware threats are recognized by the computer industry and are becoming more and more important to mitigate against, such as in the context of defense, secure cloud, and 5G applications. This is equally important for secure supply chain where the computing assets are exposed to unauthorized modifications intended to bypass the security protections and take the entire control of the system and network it is operating upon.

BRIEF DESCRIPTION OF THE FIGURES

Various implementations in accordance with the present disclosure will be described with reference to the drawings, in which

FIG. 3 is a flow diagram illustrating an example of a process for performing a secure boot of a processing device of a computer system in accordance with some examples.

DETAILED DESCRIPTION

Figure 1:
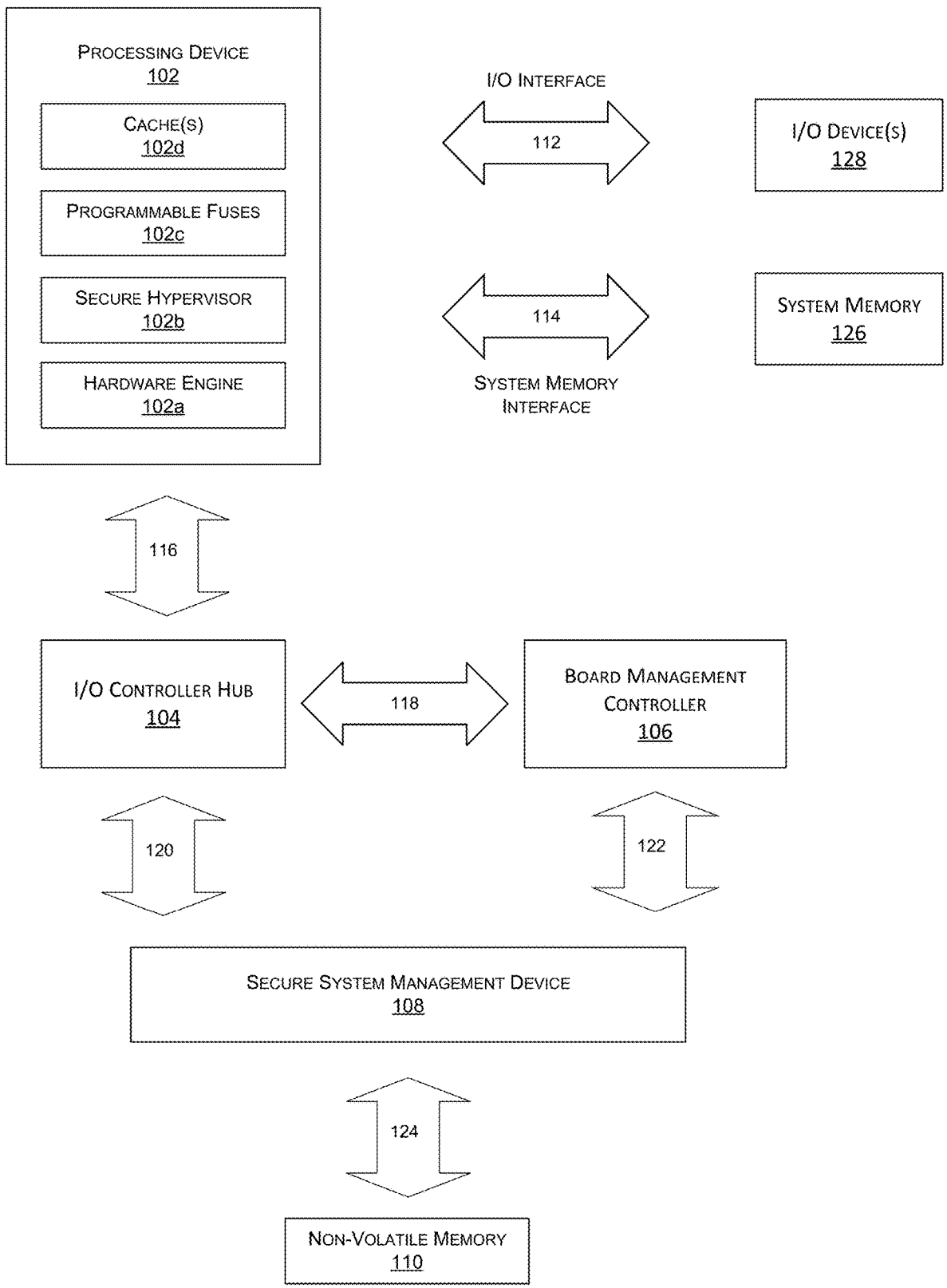
FIG. 1 illustrates a computer system which can be used to describe certain implementations of subject matter.

Confidential computing involves sending data from a source computing device to a trusted processing device. The processing device can perform computations on the data before sending the data back to the source computing device. In some cases, the processing device can send the data to other computing devices (e.g., specialized computing devices that perform specific computations on the data). The data should be kept confidential, and therefore can be encrypted before being sent to the processing device.

An example of confidential computing is remote computing in which a local computing device of a local party sends data over a network to a remote party, such as a cloud service provider that administers one or more remote computing devices. The local party trusts the remote computing device to be secure and trusts the one or more remote computing devices to distribute the data only to other secure and non-secure devices in a secure manner. However, security risks may arise if the remote party misrepresents the security of the remote computing device or distributes the local party's data from a secure device to other devices that are not secure.

Furthermore, in certain existing computer systems, a processing device (e.g., a central processing unit (CPU), a graphics processing unit (GPU), a digital signal processor (DSP), a field-programmable gate array (FPGA), an artificial intelligence accelerator, and/or other processing devices) may boot through an input/output (I/O) controller hub over a bus interface. In some cases, a management engine (ME) in the I/O controller hub may include one-time programmable field programmable fuses (FPFs). A public key of the computer system's basic input output system (BIOS) signature can be flashed into the FPFs during the manufacturing process. The ME may provide the public key stored in the FPFs to the processing device.

Existing boot processes (e.g., Intel's Boot Guard) may perform a hash of the public key received from the ME. The processing unit may then authenticate the initial boot block (IBB) of the BIOS. However, the interface between the processing unit and the I/O controller hub may not be secure from physical attacks if the interface is not encrypted. Such dependency on the ME can expose the computer system to vulnerability, for example, if the ME is exposed to a software based attack, is misappropriated, or is otherwise compromised. Additionally, certain memory devices currently in use (e.g., dynamic random access ram (DRAM), solid state drives (SSDs)) may not have the intelligence to ensure integrity of stored data. In such cases, a computer system may be exposed to unauthorized modifications from malicious software and/or hardware attacks.

To reduce the susceptibility of a computing device to malicious attacks, systems and techniques are described herein for performing (e.g., by a processing device such as the processing devices described above) a secure boot process, such as by using static and/or dynamic fuses. The static and/or dynamic fuses can encode a secret key that is used during the secure boot process. During the secure boot process, the BIOS that is to be run on the computing device can be authenticated, to ensure it is secure. A secret key can be a numerical value that is visible to an entity reading it and/or performing key derivation operations (e.g., the entity can be a processing device or microcode associated with the processing device). The secret key can be used to derive an encryption key, which can be a numerical value derived from the secret key and used in a symmetric encryption algorithm (e.g., Advanced Encryption Standard (AES) or other symmetric encryption algorithm) by a processing device.

In addition to confirming the security of the BIOS, a source computing device (e.g., a memory device, a processing device, and/or other device) can also confirm that the data communicated to and stored by the processing device is done so in a secure manner. For example, additional security can be achieved by encrypting data with integrity and anti-replay. Integrity protects the data from unauthorized changes (e.g., changes made by a malicious party that may intercept the data when it is sent from a processing device to a storage unit). Anti-replay protects against a malicious party delaying or sending fraudulent data to a processing device (e.g., after the processing device requests data from a storage unit).

To achieve secure communication and storage while minimize the vulnerability of attacks, the processing device can authenticate data and/or the communication of the data. In some examples, the processing device can provide memory and I/O traffic encryption with integrity and anti-replay using a secure hypervisor by exposing a hardware encryption engine to the secure hypervisor via a control register interface.

A secure hypervisor can be a hypervisor or virtual machine manager (VMM) that is authenticated by the BIOS. For example, when the processing device performs a secure boot and authenticates the BIOS, the BIOS can then authenticate the secure hypervisor (e.g., by performing a digital signature verification). The processing device can be configured to run the BIOS only if authentication of the BIOS and/or the secure hypervisor succeeds.

A hardware encryption engine can be any implementation of a component on the die of a processing device that performs memory encryption. The hardware encryption engine can employ integrity and anti-replay properties in addition to memory encryption (e.g., inline memory encryption).

The control register interface can be an application programing interface (API) that the processing device defines in order for the secure hypervisor to enable or disable the hardware encryption engine and/or control the hardware encryption engine (e.g., so that the hardware encryption engine can generate encryption and integrity keys or define a range or ranges of memory of a memory unit to be protected).

As an example, to provide integrity, a memory controller of the processing device can encrypt data stored in a memory storage unit, such as a DRAM. A secure hypervisor, virtual machine manager, and/or operating system of the processing device can expose the portion of the memory storage unit that is protected by the memory encryption to other processing devices, while not exposing portions of the memory storage unit that are not protected by the memory encryption to other processing devices. To provide anti-replay, for example, a hash of a value written to a cache of the computer system can be compared for equality to a hash of data read from a memory unit or I/O device of the computer system.

The techniques and systems described herein can minimize the trusted computing base (TCB) of a computer system. The TCB of a computer system includes hardware, firmware, and/or software components that are critical to the security of the computer system. A security vulnerability that occurs inside the TCB can enable an unauthorized party to control the computer system and can lead to data breaches or other unwanted consequences that affect the security properties of the entire system.

In some examples, the techniques and systems described herein provide unique security capabilities that can harden the computer system against both software and hardware/physical attacks using a security hardened processing device. In certain implementations, the TCB can be minimized at the platform level of the computer system by making the security hardened processing device the root of trust for a secure boot process, and removing dependency on other components from the secure boot process. Platform level refers to the platform of the computer system, which can be the collection of all hardware devices attached to a motherboard of the computer system as well as all firmware and software running on all hardware devices of the computer system. A root of trust is an element of a computing system that can provide security capabilities such as software, firmware, and/or BIOS confidentiality and/or data traffic encryption with integrity and anti-replay between other elements of the computing system. For example, a root of trust (e.g., for a hardware device) can be a hardware unit that employs various security capabilities and controls the execution of that hardware device as closely as possible to the time (T0) when the hardware device is powered up or reset (e.g., as close to the time T0 as possible). The secure boot process may be defined as the initial boot sequence for the platform of the computer system. The TCB can be further minimized by the use of a self-contained (e.g., internal memory), instant-on, secure device that can serve as a platform boot and power management agent.

FIG. 1 illustrates a computer system 100, which can be used to describe certain implementations of the subject matter described herein. The computer system 100 may include a processing device 102, an I/O controller hub 104, a board management controller 106, a secure system management device 108, a non-volatile memory 110, a system memory 126, and I/O device(s) 128. Note that the computer system 100 may include additional or different components which are not shown in FIG. 1 for the ease of simplicity. The computer system 100 may be used in cloud computing, edge computing, fog computing, mobile computing, or in other suitable applications.

Different components of the computer systems may communicate on a platform board using interfaces based on suitable bus protocol (e.g., peripheral component interconnect (PCI), PCI express (PCIe), low pin count (LPC), serial peripheral interface (SPI), system management bus (SMBus), universal serial bus (USB), SATA, among others). The non-volatile memory 110 may be implemented using flash, ROM, solid-state storage (SSD), etc. Note that in some instances, two or more components of the computer system 100 may be integrated. For example, the two or more components of the computer system 100 may be on the same die or their functionality may be integrated.

The processing device 102 can be a security hardened processing device that can provide capabilities to implement a secure boot process on the platform, as well as support memory and I/O traffic encryption with integrity and anti-replay. The processing device 102 may include one or more processor cores based on Intel®, AMD®, ARM®, or other suitable architectures. The processing device 102 may also execute a hardware engine 102a to perform the traffic encryption with integrity and anti-replay for interfaces with the system memory 126 and the I/O devices 128. The processing device 102 may support the traffic encryption with integrity and anti-replay via a secure hypervisor (or virtual machine manager) 102b.

The processing device 102 may also include programmable fuses 102c. For example, the programmable fuses 102c can be static or dynamic fuses. Static fuses are those that can only be programmed once and, once programmed, retain their programmed value. Dynamic fuses are fuses that can be programmed multiple times and, once programmed, retain their programmed value until they are reprogrammed. Programming, or burning, a fuse refers to the process of applying an electrical signal to the fuse to embed a readable value into the fuse. The readable value can be a one-bit binary value, and reading the value of a fuse refers to determining its readable value. Multiple fuses can be read to determine a multi-bit value.

The programmable fuses 102c can be static or dynamic fuses that were programmed by the original device manufacturer (ODM). The programmable fuses 102c may be part of microcode accessible fuses for the processing device 102 that may generally be used for silicon specific tuning based on the testing performed on the silicon. Using techniques described herein, the programmable fuses 102c can be repurposed to implement the secure boot process. For instance, as described in more detail below, the programmable fuses 102c can be programmed to embed a secret key or an encryption key that is used during the secure boot process.

The processing device 102 may utilize various interfaces to communicate with peripherals, memory devices, I/O devices, controllers, etc. For example, an I/O interface 112 may be used to communicate with various I/O devices 128 (e.g., accelerators for graphics, artificial intelligence (AI), etc). The I/O interface 112 may be based on a peripheral component interconnect express (PCIe) interface or another suitable interface based on the I/O device. A system memory interface 114 may be used to communicate with the system memory 126 (e.g., DRAM, SDRAM, DDR SDRAM). For example, in certain implementations, the system memory interface 114 may include data direction register (DDRx) channels to communicate with double data rate (DDR) memories.

The I/O controller hub 104 may include a centralized I/O controller to communicate with various peripherals and other components on the platform to provide other support functions for the processing device 102. In some examples, the I/O controller hub 104 may be implemented as a platform controller hub (e.g., Intel® PCH) comprising a management engine (e.g., Intel® management engine). In other examples, some or all of the functionality of the I/O controller hub 104 may be integrated with the processing device 102. The I/O controller hub 104 and the processing device 102 may communicate with each other using a bus interface 116. The bus interface 116 may be based on a PCIe interface or a proprietary interface. In some examples, the bus interface 116 may include a direct media interface (e.g., Intel® DMI) to communicate with the I/O controller hub 104 configured as the PCH. In some implementations, the I/O controller hub 104 is omitted (e.g., such that the board management controller 106 and the secure system management device 108 communicate directly with the processing device 102).

The board management controller 106 and the I/O controller hub 104 may communicate using an interface 118. The interface 118 may be based on an LPC interface, enhanced SPI bus, or another suitable interface. The board management controller 106 may be used to monitor physical state of the board using various sensors (e.g., voltage, humidity, temperature, etc). The board management controller 106 may also include network connectivity and can be used to manage the platform through resets, firmware updates, etc. The board management controller 106 may include a processor and memory. In some examples, the board management controller 106 may boot from firmware stored in a dedicated non-volatile memory (e.g., a SPI flash), which may be internal or external to the board management controller 106. In some examples, as noted above, the processing device may boot through the I/O controller hub 104.

It is desirable that any data entering and exiting the processing device 102 from various I/O devices, peripherals, memory devices, etc., in the computer system 100 is secured and encrypted. In accordance with certain implementations, any communication with the processing device 102 over various bus interfaces (e.g., the PCIe, memory interfaces or DMI can be authenticated to minimize the vulnerability to attacks). For example, the processing device 102 can support traffic encryption over the I/O interface 112 and the system memory interface 114 with integrity and anti-replay via the secure hypervisor 102b. Implementations of the disclosed technologies can provide secure capabilities to harden the system 100 and the platform of the computer system against both software and hardware/physical attacks.

Certain implementations can minimize the TCB at platform level by removing dependency on the I/O controller hub 104 (e.g., PCH or ME) from the secure boot process. For example, the processing device 102 can be the root of trust, and the ME can be kept in recovery mode using the appropriate pins on the chip to make the system independent of the PCH. The TCB can also be minimized by utilizing the secure system management device 108 that can serve as the platform boot and power management agent.

The secure system management device 108 may be used to sequence the power for the platform of the system 100 and the processing device 102 using secure methods according to certain implementations. The secure system management device 108 may be implemented as a field programmable gate array (FPGA) or another suitable circuit. In certain examples, the secure system management device 108 can be implemented as a self-contained (e.g., internal non-volatile storage), instant-on, secure FPGA in place of traditional complex programmable logic devices (CPLDs), which may not be designed for physical security.

The secure system management device 108 may include a processor (not shown) configured to execute instructions stored in memory. The memory may include a non-volatile memory, which may be internal or external to the secure system management device 108. The secure system management device 108 may be configured to communicate with the I/O controller hub 104 via an interface 120, and with the board management controller 106 via an interface 122. The interfaces 120 and 122 may include a serial management bus (SMBus), SPI links or other suitable interfaces. In certain implementations, some of the features or functionalities of the processing device 102 may also be executed on the secure system management device 108. The secure system management device 108 may also be configured to communicate with a server for testing purposes or for running various applications.

The secure system management device 108 may also communicate with a nonvolatile memory 110 via an interface 124. In some examples, the non-volatile memory 110 may include an SPI flash. The non-volatile memory 110 may be used to store platform firmware for the computer system 100. For example, in certain implementations, the non-volatile memory 110 may store BIOS and firmware patches for the processing device 102. In this specification, the term SPI flash may be used for the non-volatile memory 110, however, it will be understood that other implementations of the non-volatile memory 110 are possible without deviating from the scope of the disclosed technologies. The secure system management device 108 may be communicatively coupled (e.g., over one or more bus interfaces) to the I/O controller hub 104, the board management controller 106 SPI links, and the non-volatile memory 110. The non-volatile memory 110 can store the active platform firmware, such as recovery and recovery candidate copies of the firmware or other software, to prevent permanent denial of service (PDOS) attacks. The secure system management device 108 may also be communicatively coupled to the I/O controller hub 104 and the board management controller 106 using one or more SMBus links, and can implement SMBus filtering to prevent PDOS attacks.

In certain implementations, the processing device 102 can be a Xeon E2200 series derivative (e.g., one having one or more stock keeping units (SKUs)) that can implement new security capabilities without any silicon changes, for example, by utilizing patches in reclaimed fuses, and patches to extend the processing device firmware (microcode and pcode), which may not be possible to achieve with the traditional architecture approaches.

In certain examples, the processing device 102 can be based on a mature processing device micro-architecture with a stable microcode patch for functional bugs, with reasonable computational power (e.g., 8 cores, hyper-threading, 2.8 GHz), lower thermal design power (TDP) for the embedded applications demanding it (e.g., 45 W), the maximum last level cache (LLC) size available (e.g., 16 MB) to be used for the secure hypervisor 102b or VMM applications and a ball grid array (BGA) form factor required by certain embedded applications, which can also improve security robustness against hardware/physical attacks.

In general, a number of dynamic fuses can be added on the silicon of the processing device 102 as a correctional mechanism for a worst case scenario. For example, dynamic fuses may be used to disable or enable certain portions of the silicon to salvage the chip from the manufacturing defects, design problems, or for other reasons. In some instances, redundant blocks added on the silicon during the design cycle can be enabled as needed, or defective logic may be disabled. However, the number of dynamic fuses that may be used for tuning the silicon is generally smaller than the number of dynamic fuses available in the processing device 102. Thus, dynamic fuses may include certain properties based on the defect ratio.

As noted above, the processing device 102 can implement a secret based secure boot approach by repurposing the programmable fuses 102c in the processing device 102 to alter the boot process of the processing device 102. Generally, the processing device 102 may utilize a number of static or dynamic fuses to store different information. For example, the fuses may be used to store information related to a secret key or an encryption key, one or more SKUs, a number of cores of the processing device, a frequency of the processing device, a cache size of the processing device, a technology type of the processing device, etc.

Certain implementations can be used to reclaim a set of unused dynamic fuses in the processing device 102 and execute a microcode patch in these reclaimed fuses to alter the reset sequence without changing the silicon. Thus, dynamic fuses for each processing device die may represent a unique signature of that processing device. Since dynamic fuses for two dies are not identical, even if they are on the same wafer, there is randomness built within the silicon. The dynamic fuses may be programmed or burned during the high volume manufacturing (HVM) process using relevant fuse files based on the patches.

Certain implementations can use this randomness in the data from dynamic fuses to generate an encryption key (e.g., AES-128) using the values of the fuses or by performing a one-way hash of the values of the fuses. For example, the processing device 102 can determine a value encoded by the fuses, generate a one-way hash of the value, and generate an encryption key from the one-way hash of the value. The randomness built within the silicon die of a processing device leads to a negligible probability that any two sets of dynamic fuses of different processing devices share the same data embedded in their fuses. Accordingly, the encryption key for each processing device can be unique and non-traceable. Furthermore, reading of the fuses cannot be done non-destructively, thus rendering the retrieving of the fuse data useless.

The encryption key generated from the fuses can be used as a shared secret key for key derivation and to provision a public key to be used for authentication (e.g., for testing the silicon, the board, or the secure FPGA, by different entities). Provisioning can include generating a private and public key pair and storing the public key, or a secure hash of the public key, in a non-volatile storage of a hardware device (e.g., fuses that can be one-time programmable).

For example, based on the implementation, different entities may be responsible for manufacturing different parts of the computer system 100 (e.g., the silicon, the board, the secure FPGA, etc., in the computer system 100). A copy of the public key can be shared with other components of the computer system 100 or with other components of other computer systems. For example, the processing system 100 can share a copy of the public key with another processing device. The processing system 100 can authenticate another component with which it has shared a copy of its public key by prompting the other component to provide the copy which can then be compared for equality with the public key. If the public key and the copy of the public key are not equal, then the authentication fails. The hash of the public key can be stored in the non-volatile memory 110.

In some examples, the secret based secure boot process may implement a key derivation algorithm based on the secret key generated from the reclaimed fuses. Each entity responsible for their respective component(s) on the platform (e.g., the processing device 102) can provision the public key from the secret key by generating a respective pair of a private key and a public key. For example, the private-public key pair can be generated from the secret key generated from the reclaimed fuses. In some cases, the secret key generated from the fuses can be modified (referred to as a "modified secret key") by concatenating the secrete key with a constant numerical value and processing the concatenated value using a secure hash algorithm or one-way function so that the secret key cannot be determined if the modified secret key is compromised. The modified secret key can be used as a random number (e.g., a random number having a large number of bits such as 2048 bits) or seed that can be processed by a private-public key generation algorithm (e.g., Rivest-Shamir-Adleman (RSA) algorithm, an Elliptic Curve Digital Signature Algorithm (ECDSA), or other algorithm) to generate the private-public key pair having extremely low probability of collision. For example, the random number (the modified secret key) can be used to find the closest or nearest prime number to be used in the key generation.

Microcode associated with the processing device 102 can be used to wrap their respective public key with the secret key (e.g., using AES-128, AES-256, and/or other encryption algorithm) and to encode each wrapped public key in a key provisioning blob in storage or memory (e.g., in the SPI flash). Wrapping a public key with a secret key or encryption key refers to encrypting the public key with the secret key or encryption key to form an encrypted key. Unwrapping a public key refers to decrypting the encrypted key to retrieve the public key.

As noted above, in certain examples, the private keys can be based on the RSA algorithm for deriving private and public keys (e.g., 2048 bit keys). For instance, the respective private-public key pairs can be generated using random numbers generated by a digital random number generator (DRNG) in the processing device 102. In some examples, the respective private key can be based on the nearest prime number identified using an algorithm from the 2048-bit random number generated by the DRNG. The very nature of the random number generator can avoid a possible collision of the same private key for different entities.

For each subsequent boot sequence, the respective microcode for each entity can identify the public key from the key provisioning blob, which is encrypted with its respective key. The processing device 102 can use the public key to authenticate the BIOS. For example the BIOS can be authenticated by decrypting the secret key or encryption key from the fuses and the hash of the respective public key that was provisioned. Thus, the keys used by different entities will be unique and cannot be exposed among different entities. This can allow different entities to execute their respective software (e.g., test suites) using their respective private keys derived from the secret key or encryption key based on the reclaimed fuses.

Additionally, in some examples, the processing device 102 can perform cross-authentication for different entities as their respective software is executed. As an example, the secure system management device 108 may communicate with a server to execute certain software on the platform. The processing device 102 can use the public key embedded in the secure system management device 108 for authentication to communicate with the server. The software that runs with the public key may generate a random number using the DRNG and may request the server to sign this random number with their private key for authentication and recover the public key to communicate with the server. Similarly, the secure system management device 108 may communicate with the processing device 102 for authentication (e.g., using the Diffie-Hellman key exchange).

For example, the secure system management device 108 may communicate with the processing device 102 using the public key embedded in the secure system management device 108 and the key provisioned from the secret key or encryption key derived from the reclaimed fuses. If the public key for the secure system management device 108 is altered to execute malicious code on the processing device 102, cross-authentication between the secure system management device 108, the processing device 102, and the server may fail, thus exposing the key alteration.

Cross-authentication between two parties that are connected by a link (e.g. a processing device 102 and an AI accelerator (not shown) connected to the processing device 102 by a PCIe link) refers to one or both of the parties performing certain cryptographic algorithms to ensure that each party is communicating with the party they expect to be communicating with. For example, an initial shared encryption key can be stored in each hardware entity connected to a particular link (e.g., a random encryption key can be stored in non-volatile structures such as fuses of the hardware entity). When the computer system is powered up or reset, each hardware entity (e.g., the processing device 102 and the AI accelerator) can generate a random number (e.g., using a respective DRNG engine), encrypt the random number with the shared encryption key, and send the encrypted random number to the other party or parties. The other party can decrypt the encrypted random number and send the decrypted random number, or an encrypted version of the decrypted random number, back to each hardware entity. In some implementations, the other party can add a constant to the decrypted random number or flip one or more bits of the decrypted random number (e.g., as a confirmation that it was received), encrypt the result with the shared encryption key, and send the encrypted result to one or more of the other hardware entities. Each party can decrypt the message and verify that the decrypted value is the expected value. Following the cross-authentication, the processing device can generate a session key (for example through an exclusive-OR (XOR) operation of the random number and another random number).

Certain implementations can perform memory encryption for accesses to certain I/O devices (e.g., PCIe devices) and the system memory 126 with integrity and anti-replay by exposing the hardware engine 102a to the secure hypervisor 102b via a control register interface (e.g., using an application programming interface). In some implementations, the control registers may include model specific registers (MSRs).

In certain implementations, a memory controller in the processing device 102 can support encrypting a range of physical addresses represented as a moving window across the full memory range of the system memory 126. For example, the moving window size can be 256 MB represented by a lower limit and a higher limit of the physical addresses, which can cover the full memory space (e.g., 128 GB) using the secure hypervisor 102b. The control registers may be used to program the window size and the capability of having a programmable window. The secure hypervisor 102b may access the control registers and program the window. The secure hypervisor 102b may perform memory encryption for the accesses in the window. Thus, certain implementations can be used to cover the full memory (e.g., 128 GB) encryption by the secure hypervisor 102b using the moving window (e.g., 256 MB). For example, page swapping, virtualization, extended page tables (EPT) or other suitable mechanisms may be used to expand memory encryption with integrity and anti-replay to the full memory supported by the processing device 102.

The cache(s) 102d may include one or more levels of caches for the processing device. For example, the cache 102d may include a last level cache (LLC). The hardware engine 102a may be configured to perform one-way hash using any secure hash algorithm (SHA) of memory data (e.g., 64 byte cache line) to implement anti-replay functionality. In some instances, one-way hash of each cache line in the window may be performed and stored along with the data in an on-chip memory (e.g., SRAM). The data inside the window can be protected for anti-replay by the hardware engine 102a. Any data outside the window can be encrypted by the secure hypervisor 102b for anti-replay.

For the anti-replay functionality, the hardware engine 102a determines whether a hash of the last value written in the cache for a particular address matches a hash of the data read from the system memory 126 or the I/O device 128 at the corresponding address. In instances where a previous value from the same address is read or the data has been modified in the memory, a hash of that value will be different than the hash of the stored data, thus exposing the mismatch for memory integrity and anti-replay. Note that any method for memory encryption may be performed, without deviating from the scope of the disclosed technologies, as long as the hardware engine for performing the encryption can be exposed to the secure hypervisor 102b.

In some implementations, if the hardware engine 102a has limited protected memory support, the scaling of the memory from the protected memory of a memory device to the full memory of the memory device can be performed by trusted hardware or software (e.g., the hypervisor 102b, the VMM, or the operating system of the computer system or processing device). In some implementations, memory scaling can be accelerated by firmware of the processing device (e.g. microcode).

Figure 2:
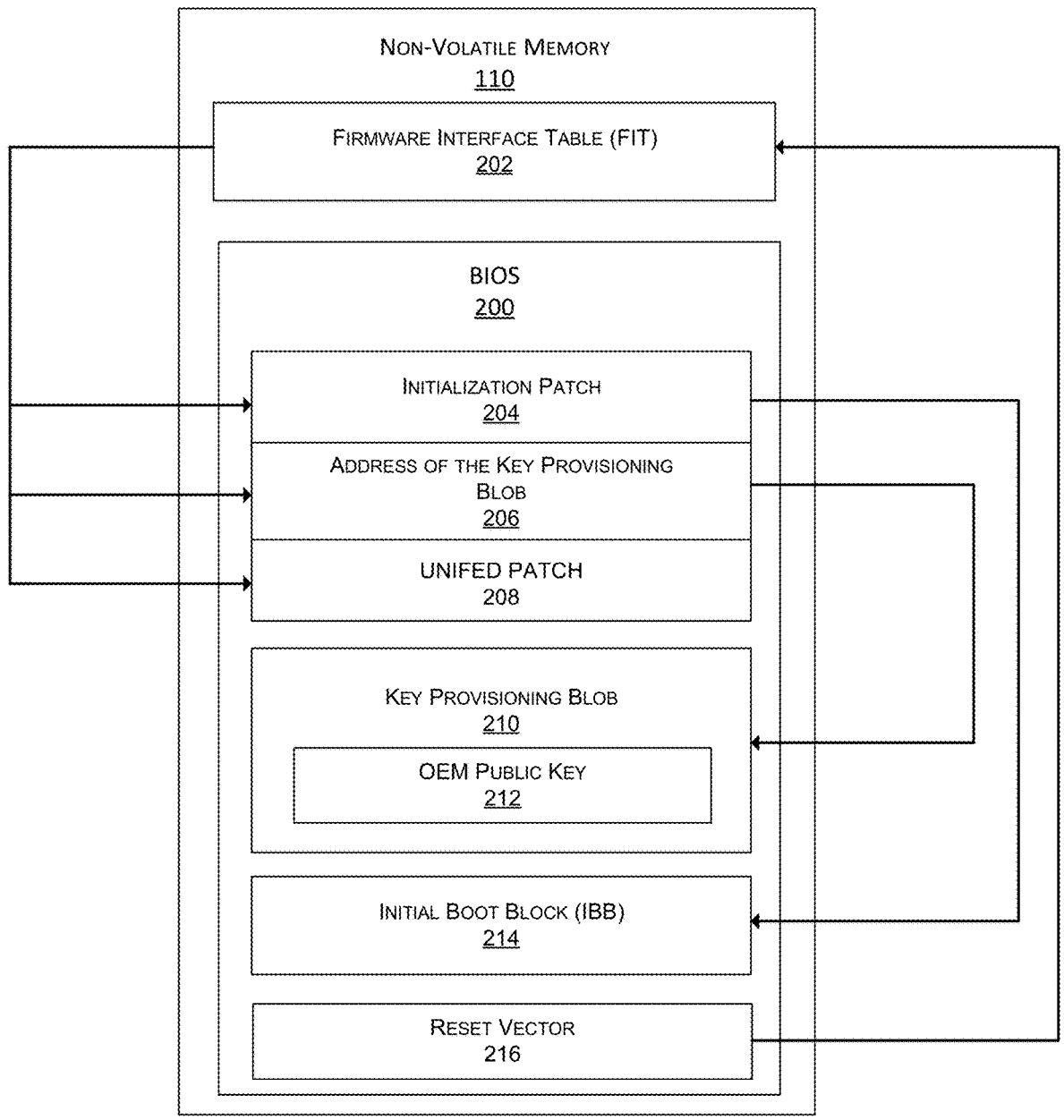
FIG. 2 shows an example image for a non-volatile memory, in certain implementations.

FIG. 2 shows an example image for the non-volatile memory 110, in certain implementations. The non-volatile memory 110 or the SPI flash may store a firmware interface table (FIT) 202, and BIOS 200 comprising an initialization patch 204, an address of the key provisioning blob 206, a unified patch 208, a key provisioning blob 210, an initial boot block (IBB) 214 and a reset vector 216.

According to certain implementations, the fuses in the processing device 102, which are accessible by the microcode, can be modified to include a patch in the fuses that can load the initialization patch 204 from the SPI flash. For example, the BIOS 200 and the initialization patch 204 can be loaded from the SPI flash via the FIT 202.

The FIT 202 may be implemented as a data structure in the SPI flash with multiple entries. Each entry may define a starting address and certain attributes of different patches in the SPI flash. At reset, before executing the first BIOS instruction at a reset vector 216, the initialization patch 204 can be loaded by the processing device 102 using the FIT 202. The initialization patch 204 can be computer code that can be used to perform the key derivation and secure boot process in accordance with certain implementations, and then load the runtime patch (e.g., microcode and pcode) from the SPI flash via the FIT 202. Thus, by using the FIT 202, a root of trust for the BIOS 200 can be established by the processing device 102 without any dependency on the I/O controller hub 104.

In some examples, the processing device 102 can be Xeon E 2200 series derivative and therefore the existing high volume manufacturing (HVM) process for this processing device family can be used for the major portion of the secure processing device manufacturing. The fuses may be over-ridden during the product platform validation (PPV) step and the final fusing may occur after the PPV is passed. The fuses may be burned using a fuse file, which may include specific patches in the fuses section for the security hardened processing device 102 SKU(s). The microcode patch in the fuses can be designed to implement the initial RESET support for the processing device 102. The microcode patch in the fuses may load the initialization patch 204 on all the cores of the processing device 102 from the non-volatile memory 110 via the FIT 202. If the initialization patch 204 is missing or fails authentication, the microcode patch may enter unbreakable shutdown.

In some implementations, if the processing device 102 or a microcode patch of the processing device 102 enters an unbreakable shutdown process, the processing device 102 can halt the execution of any instructions and the service of any events (e.g., machine check, system management interrupt (SMI), initialization (INIT), etc.) except for a RESET event. In such implementations, in order to continue executing instructions or servicing events, the processing device 102 may require a reset.

In certain implementations, the initialization patch 204 may perform the key derivation algorithm based on a one-way hash (e.g., SHA256) of all the microcode accessible fuses in the processing device 102 and a one-way hash (e.g., SHA256) of the initialization patch 204. The initialization patch 204 may perform the automatic original equipment manufacturer (OEM) public key provisioning (if requested) by encrypting the one-way hash of an OEM public key loaded from the key provisioning blob 210 in the SPI flash with the encryption key (e.g., AES 128-bit key) computed by the key derivation algorithm and may store it in the same key provisioning blob 210 in the SPI flash as an encrypted OEM public key 212.

The key provisioning blob 210 can be located in the SPI flash and its address may be located in the SPI flash immediately after the initialization patch 204. A first portion (e.g., first 4 KBs) of the key provisioning blob 210 may store all ones if the OEM public key was provisioned and a different value than all ones if the OEM public key provisioning was not requested. A second portion (e.g., second 4 KBs) of the key provisioning blob 210 may store the encrypted OEM public key 212 (e.g., the initialization vector (IV), encrypted OEM public key and encrypted integrity).

If no OEM public key provisioning is requested based on the value stored in the first portion, the initialization patch 204 may decrypt the provisioned public key blob and extract the one-way hash of the OEM public key. The initialization patch 204 can then load and authenticate the BIOS IBB from the SPI flash into the protected last level cache (LLC) using the provided OEM public key. As a security check, the processing device 102 can determine whether the one-way hash of the OEM public key matches the one from the decrypted OEM public key blob. The bootstrap processor (BSP) thread can begin execution of the BIOS IBB 214 in the LLC similar to the traditional secure boot process.

The processing device 102 can load and authenticate the unified patches 208 on all the cores of the processing device. The unified patches 208 may include microcode patches for loadtime, and runtime. Certain implementations can include capabilities for extending the microcode patching capabilities to support the functionalities implemented by the processing device 102. Any known methods to extend the microcode patching capabilities can be used within the scope of the disclosure.

The unified patches 208 may be double signed by the processing device vendor (e.g., Intel, AMD, ARM, etc.) and the OEM to prevent insider attacks or malicious use of defective patches escaped in the wild (that cannot be recalled). For example, a one-way hash of a public key associated with the processing device can be performed to sign a microcode patch. The microcode patch can be signed again (double signed) using the OEM public key to authenticate the microcode patch. The unified patches 208 may reside in the SPI flash (e.g., immediately after bits that contain the address of the key provisioning blob 206). In certain implementations, a microcode patch loader interface that can support loading and enabling of the patches can be used.

The one-way hash of the OEM public key used for double signing of the microcode patches can be similar to the one used for the BIOS IBB authentication. Having the secure processing device (e.g., processing device 102) as the root of trust can provide a secure robust approach for minimizing the TCB. This may be highly desirable for government agencies and defense contractors. The BIOS 200 may initialize the processing device 102 and the platform hardware including the system memory 126 (e.g., DRAM) and the firmware. The BIOS 200 may comply with the standard UEFI implementation. The BIOS 200 may also be used to implement an automatic recovery of platform firmware and configuration in case either the processing device 102 or the secure system management device 108 detects a platform firmware corruption at boot time or runtime.

In certain implementations, the processing device 102 may expose a unique number to the BIOS IBB 214 that can be computed based on the one-way hash of all the microcode accessible fuses, the one-way hash of the initialization patch 204, and the one-way hash of the OEM public key 212. Once the BIOS is authenticated, the IBB 214 can be executed from the LLC in the caches 102d. The BIOS may initialize the memory controller and the window. The BIOS can load and authenticate the secure hypervisor 102b and pass the control to the secure hypervisor 102b. The secure hypervisor 102b may determine, using the control register interfaces, where it resides or reprogram the window and copy itself there. The secure hypervisor 102b may use the extended page tables (EPT) to expand the memory encryption with integrity and anti-replay to the full memory supported by the processing device 102 (e.g., up to 128 GB).

The combination of the secure processing device 102 for memory encryption with integrity and anti-replay, and the secure hypervisor 102b can mitigate sophisticated hardware attacks attempting to inject malware via system memory 126 or PCIe devices while providing relatively higher performance than the software only approach. The secure hypervisor 102b can also run legacy operating systems and applications that do not operate on sensitive data in a traditional memory operations (unencrypted) at full processing device performance. The secure system management device 108 may also implement automatic platform firmware and configuration recovery to prevent PDOS attacks corrupting critical-to-boot platform firmware and configuration information. Thus, the secure boot approach disclosed herein can provide unique security capabilities that can harden the system against both software and hardware/physical attacks. These capabilities can benefit a wide range of critical infrastructure sectors and beyond.

FIG. 3 is a flow diagram illustrating an example of a process 300 for performing a secure boot of a processing device of a computer system using the techniques described herein.

At block 302, the process 300 includes identifying a set of programmable fuses of the processing device, the processing device being configured as a root of trust for a secure boot process, the computer system including the processing device and a non-volatile memory storing a basic input/output system (BIOS) for the secure boot process. For example, the programmable fuses can be static fuses, dynamic fuses, or a combination of static and dynamic fuses.

At block 304, the process 300 includes deriving a secret key and/or an encryption key using a value encoded by the set of programmable fuses in the processing device. For example, each fuse of the set of programmable fuses can encode a bit value. The processing device can read each programmable fuse of the set of programmable fuses to determine a value encoded by the set and the secret key (or in some cases the encryption key) can be the value encoded by the set. In some implementations, the secret key (or a modified secret key, as described above) or encryption key is derived from a one-way hash of the value encoded by the set of programmable fuses in the processing device. For example, the processing device can determine a one-way hash of the value encoded by the set and the secret key (or modified secret key) or encryption key can be the one-way hash of the encoded value.

In some implementations, the process 300 includes using the secret key (or modified secret key) or encryption key to provision a public key for the processing device and a private key for the processing device. The public key for the processing device and the private key for the processing device can be provisioned using one or more random numbers generated by a random number generator of the processing device.

In some implementations, the process 300 includes cross-authenticating the public key for the processing device with one or more public keys for each of one or more computing devices of the computer system, to determine whether a subset of the one or more public keys for each of the one or more computing devices has been altered. The one or more computing devices of the computer system can include a secure system management device and a server. For example, the processing device can share a copy of its public key with one or more other computing devices of the computer system at a certain time. At a later time, the processing device can compare its public key with the one or more copies of its public key provided to the one or more other computing devices (e.g., to ensure that the copies of the public keys have not been altered).

In some implementations the process 300 includes wrapping the public key for the processing device with the secret key or encryption key and encoding the wrapped public key in a key provisioning blob. In some implementations, the key provisioning blob includes an encrypted copy of an original equipment manufacturer (OEM) public key.

In some implementations, the process 300 includes decoding the key provisioning blob to identify the wrapped public key. The process 300 can further include unwrapping the wrapped public key to identify the public key for the processing device and performing a second authentication of the BIOS using the identified public key for the processing device.

At block 306, the process 300 includes authenticating the BIOS to perform the secure boot process using a key derivation algorithm based on the secret key or encryption key.

In some implementations, the processing device is further configured to support memory traffic encryption with integrity and anti-replay using a secure hypervisor by exposing a hardware encryption engine via a control register interface.

In some implementations, the key derivation algorithm is further based in part on a one-way hash of an initialization patch in the BIOS. The initialization patch can be used to perform the key derivation algorithm based on a one-way hash of the value encoded using the set of programmable fuses in the processing device and the one-way hash of the initialization patch.

In some implementations, the process 300 includes determining whether a hash of data written to a particular address of a first memory storage unit of the computer system matches a hash of data read from a second memory storage unit of an I/O device of the computer system. A mismatch between the hashes can indicate that a malicious entity may have altered the data read from the second memory storage unit.

In some examples, the processes described herein (e.g., process 300 and/or other process described herein) may be performed by a computing device or apparatus. In one example, the process 300 can be performed by the computing system 100 of FIG. 1 (e.g., performed by the processing device 102). In another example, the process 300 can be performed by the computing system 400 of FIG. 4 (e.g., which can have some or all of the components of the computing system 100).

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 300 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 300 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 4:
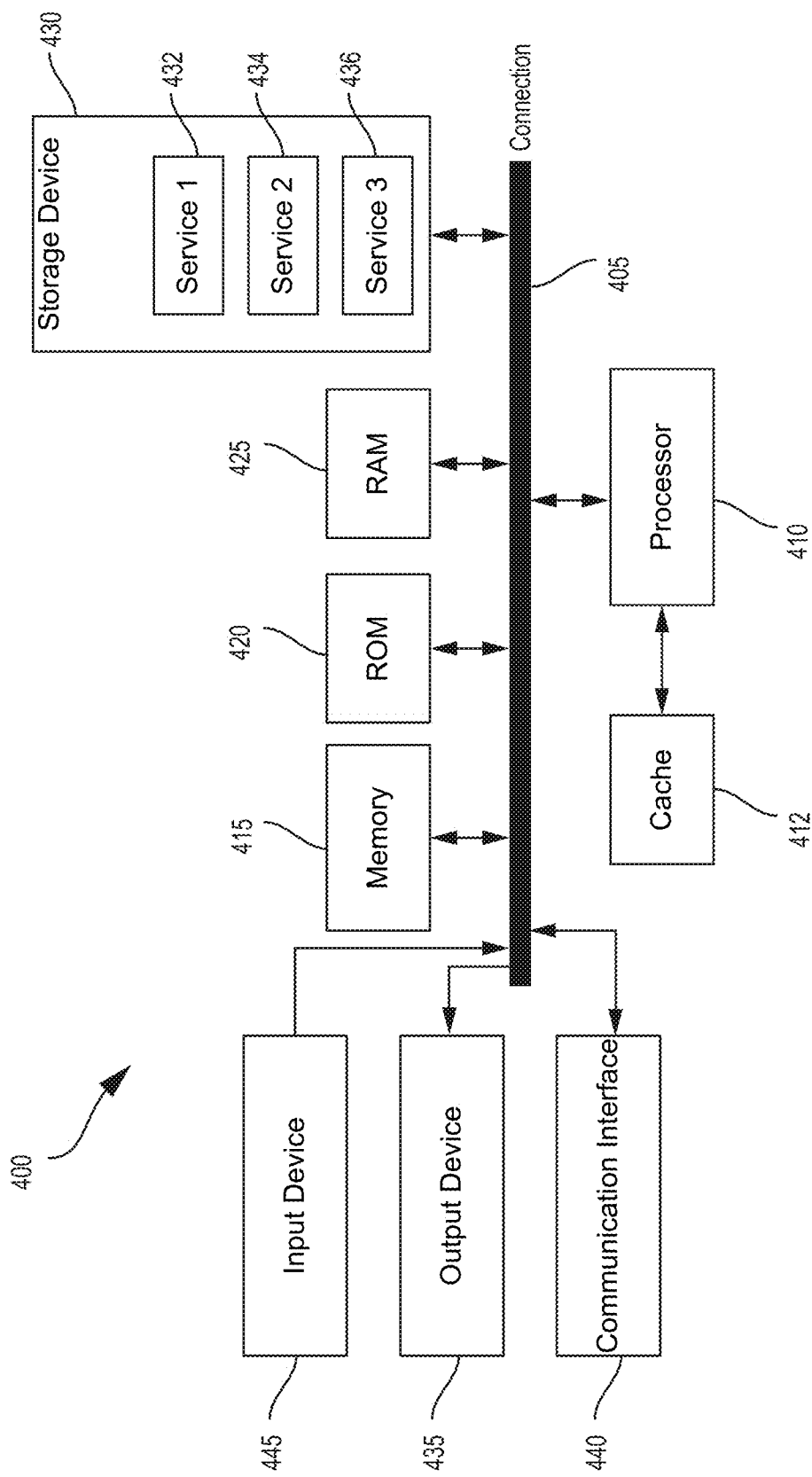
FIG. 4 is a flow diagram illustrating an example of a process for authenticating a microcode patch of a processing device of a computer system in accordance with some examples.

FIG. 4 is a diagram illustrating an example of a system for implementing certain aspects of the present technology. In particular, FIG. 4 illustrates an example of computing system 400, which can be for example any computing device making up internal computing system, such as computing system 100, or any component thereof in which the components of the system are in communication with each other using connection 405. Connection 405 can be a physical connection using a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache 412 of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms. In some instances, multimodal systems can enable a user to provide multiple types of input/output to communicate with computing system 400.

Computing system 400 can include communications interface 440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 440 may also include one or more Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method of performing a secure boot of a processing device of a computing system, the method comprising:

accessing an encoded value from a plurality of programmable fuses on a die of the processing device, the computing system comprising the processing device as a root of trust for a secure boot process and a non-volatile memory storing a basic input/output system (BIOS) for the secure boot process;

deriving, by the processing device, an encryption key using the encoded value of the plurality of programmable fuses on the die of the processing device;

provisioning, using the encryption key, a plurality of public keys for a plurality of computing devices of the computing system, each public key of the plurality of public keys unique to one of the plurality of computing devices of the computing system;
wrapping, with the encryption key, the plurality of public keys for the plurality of computing devices of the computing system into a key provisioning blob;
identifying, based on a microcode associated with a particular computing device of the computing system and from the key provisioning blob, a particular public key of the plurality of public keys; and
authenticating, by the processing device and based on the identified particular public key, the BIOS to perform the secure boot process.

2. The method of claim 1, further comprising:
using the encryption key to provision a private key for the processing device.

3. The method of claim 2, wherein the private key for the processing device is provisioned using one or more random numbers generated by a random number generator of the processing device.

4. The method of claim 1, further comprising:
decoding the key provisioning blob to identify a wrapped particular public key;
unwrapping the wrapped particular public key to identify a public key for the processing device; and
performing a second authentication of the BIOS using the identified public key for the processing device.

5. The method of claim 1, wherein the key provisioning blob includes an encrypted copy of an original equipment manufacturer (OEM) public key.

6. The method of claim 4, further comprising:
cross-authenticating the public key for the processing device with the plurality of public keys for each of the plurality of computing devices of the computing system, to determine whether a subset of the plurality of public keys for each of the plurality of computing devices has been altered, wherein the plurality of computing devices of the computing system include a secure system management device and a server.

7. The method of claim 1, wherein the encryption key is derived from a one-way hash of a value encoded by the plurality of programmable fuses in the processing device.

8. The method of claim 1, further comprising:
determining whether a hash of data written to a particular address of a first memory storage unit of the computing system matches a hash of data read from a second memory storage unit of an I/O device of the computing system.

9. The method of claim 1, further comprising applying a key derivation algorithm based in part on a one-way hash of an initialization patch in the BIOS, wherein the initialization patch is used to perform the key derivation algorithm based on a one-way hash of a value encoded using the plurality of programmable fuses in the processing device and the one-way hash of the initialization patch.

10. The method of claim 1, wherein the processing device is further configured to access a secure hypervisor for memory traffic encryption with integrity and anti-replay by exposing a hardware encryption engine via a control register interface.

11. An apparatus, comprising:
at least one memory configured to store a basic input/output system (BIOS) for a secure boot process; and
a processing device comprising a plurality of programmable fuses on a die of the processing device and coupled to the at least one memory, the processing device being configured as a root of trust for the secure boot process, the processing device being configured to execute one or more instructions of the secure boot process to:
access the plurality of programmable fuses on the die of the processing device;
derive an encryption key using a value encoded by the plurality of programmable fuses on the die of the processing device;
provision, using the encryption key, a plurality of public keys for a plurality of computing devices with access to the processing device, each public key of the plurality of public keys unique to one of the plurality of computing devices;
wrap, with the encryption key, the plurality of public keys for the plurality of computing devices into a key provisioning blob;
identify, based on a microcode associated with a particular computing device of the plurality of computing devices and from the key provisioning blob, a particular public key of the plurality of public keys; and
authenticate, based on the identified particular public key, the BIOS to perform the secure boot process.

12. The apparatus of claim 11, wherein the processing device is configured to execute further one or more instructions to:
use the encryption key to provision a private key for the processing device.

13. The apparatus of claim 12, wherein the private key for the processing device is provisioned using one or more random numbers generated by a random number generator of the processing device.

14. The apparatus of claim 11, wherein the processing device is configured to execute further one or more instructions to:
decode the key provisioning blob to identify a wrapped particular public key;
unwrap the wrapped particular public key to identify a public key for the processing device; and
perform a second authentication of the BIOS using the identified public key for the processing device.

15. The apparatus of claim 11, wherein the key provisioning blob includes an encrypted copy of an original equipment manufacturer (OEM) public key.

16. The apparatus of claim 14, wherein the processing device is configured to execute further one or more instructions to:
cross-authenticate the public key for the processing device with the plurality of public keys for each of the plurality of computing devices, to determine whether a subset of the plurality of public keys for each of the plurality of computing devices has been altered, wherein the plurality of computing devices include a secure system management device and a server.

17. The apparatus of claim 11, wherein the encryption key is derived from a one-way hash of the value encoded by the plurality of programmable fuses in the processing device.

18. A non-transitory computer-readable medium comprising at least one instruction for causing a processing device to:
access an encoded value from a plurality of programmable fuses on a die of the processing device, the processing device being configured as a root of trust for a secure boot process, the non-transitory computer-readable medium storing a basic input/output system (BIOS) for the secure boot process;

derive, by the processing device, an encryption key using the encoded value of the plurality of programmable fuses on the die of the processing device;

provision, using the encryption key, a plurality of public keys for a plurality of computing devices of a computing system, each public key of the plurality of public keys unique to one of the plurality of computing devices of the computing system;

wrap, with the encryption key, the plurality of public keys for the plurality of computing devices of the computing system into a key provisioning blob;

identify, based on a microcode associated with a particular computing device of the computing system and from the key provisioning blob, a particular public key of the plurality of public keys; and authenticate, by the processing device and based on the identified particular public key, the BIOS to perform the secure boot process.

* * * * *